United States Patent
Gierer et al.

(10) Patent No.: US 6,179,108 B1
(45) Date of Patent: Jan. 30, 2001

(54) DEVICE FOR RELEASING A SECURITY DEVICE FOR A VEHICLE WITH AN AUTOMATIC TRANSMISSION IN CASE OF EMERGENCY

(75) Inventors: Georg Gierer, Kressbronn; Uwe Rühringer, Tettnang, both of (DE)

(73) Assignee: ZF Friedrichshafen AG, Friedrichshafen (DE)

(*) Notice: Under 35 U.S.C. 154(b), the term of this patent shall be extended for 0 days.

(21) Appl. No.: 09/379,441

(22) Filed: Aug. 23, 1999

(30) Foreign Application Priority Data

Oct. 22, 1998 (DE) .................................... 198 48 733

(51) Int. Cl.⁷ .................................................. B60K 41/26
(52) U.S. Cl. ...................................................... 192/218
(58) Field of Search ........................... 192/218, 219.5, 192/219.4; 188/168, 106 R, 106 P; 303/18

(56) References Cited

U.S. PATENT DOCUMENTS

| | | | |
|---|---|---|---|
| 1,458,136 | * 6/1923 | Kloepper | 192/219.5 |
| 2,263,251 | * 11/1941 | Struensee et al. | 188/168 |
| 5,238,298 | * 8/1993 | Wagner et al. | 303/18 X |
| 5,954,179 | * 9/1999 | Osborn | 192/219.5 |

FOREIGN PATENT DOCUMENTS

| 196 43 304 A1 | 4/1998 | (DE) . |
|---|---|---|
| 0 650 000 A1 | 4/1995 | (EP) . |

* cited by examiner

*Primary Examiner*—Rodney H. Bonck
(74) *Attorney, Agent, or Firm*—Davis and Bujold

(57) ABSTRACT

Device for releasing in case of emergency a security device for a motor vehicle having an automatic transmission (1) in which the parking lock of the automatic transmission (1) is released by actuating a towing device (2) accessible from outside the motor vehicle and the axial movement associated therewith of the operative connection (3) between the towing device (2) and the release device (10) on the automatic transmission (1). By a stop (12) of the towing device (2) the release device (10) remains activated until the stop (12) on the towing device is deactivated.

6 Claims, 2 Drawing Sheets

Figure 1:
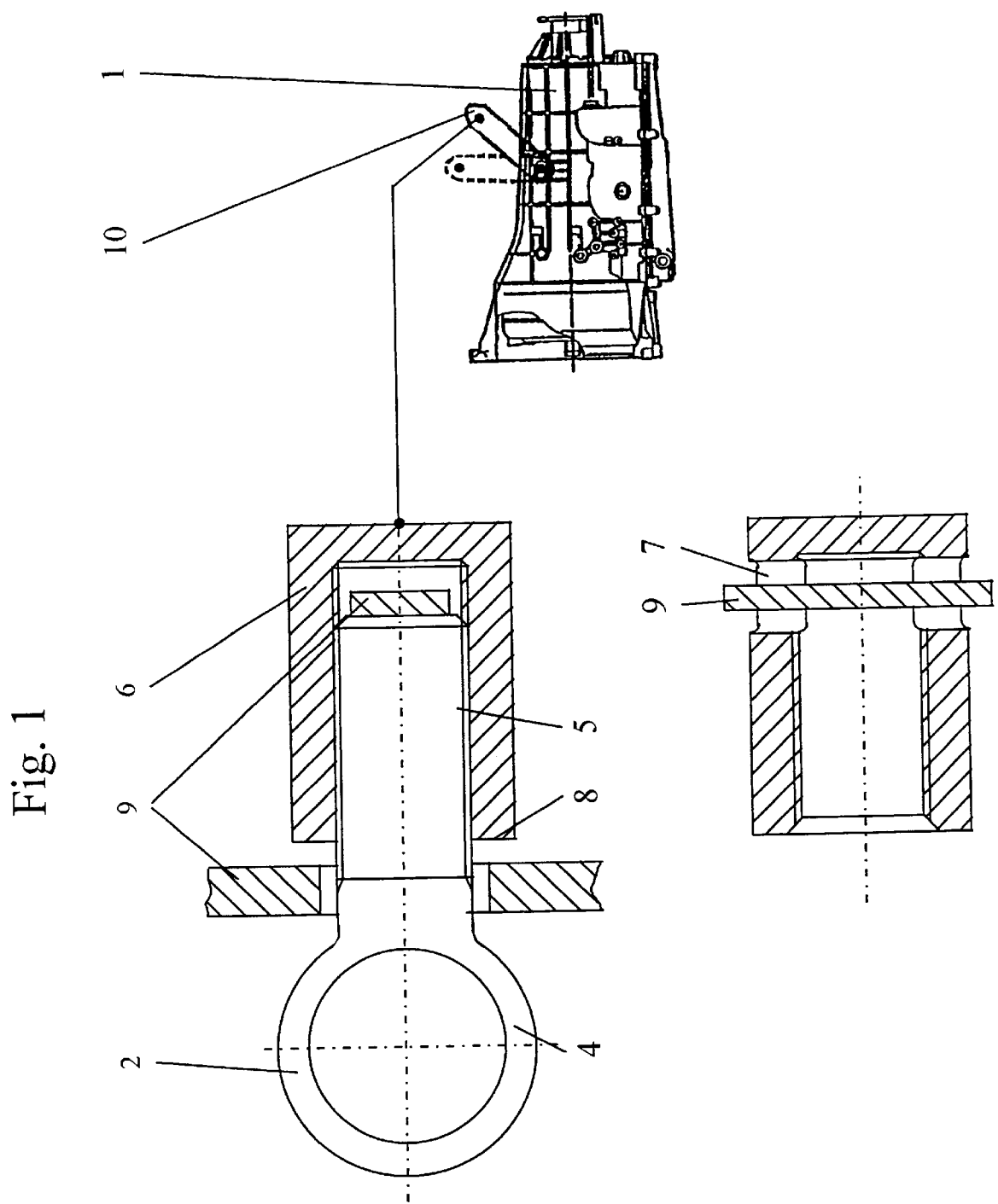

DEVICE FOR RELEASING A SECURITY DEVICE FOR A VEHICLE WITH AN AUTOMATIC TRANSMISSION IN CASE OF EMERGENCY

The invention concerns a device for releasing in case of emergency a security device for a motor vehicle having an automatic transmission in which, when a parking position is introduced, an electrical parking lock integrated in the automatic transmission is activated by means of a gear selector device.

BACKGROUND OF THE INVENTION

Automatic transmissions have a parking lock which with the introduction of a parking position is activated via a gear selector device. The parking lock usually consists of a parking lock gear situated upon a transmission output shaft and a parking pawl which meshes in the parking lock gear. The parking lock is actuated by means of the gear selector device usually electrically or via a Bowden cable.

EP 0 650 000 A1, e.g. thus shows a purely electrical system in which the parking lock is activated and deactivated by an electronic transmission control system, via a stepping motor and a rear-mounted encoder. In said purely electrical parking lock, the problem now appears in the practice that when the battery is discharged no more sufficient electrical energy is available in order to release the parking lock.

In addition to this, DE 196 43 304 describes a solution in which from the interior of the vehicle, via a manually operated device coupled with a braking pedal already available, a spring accumulator is released which brings the selector shaft to neutral position and thus releases the pawl of the parking lock.

In the already known solutions, the parking lock has to be released only from the interior of the vehicle. If the vehicle has to be moved without entering into the vehicle, the parking lock has to be releasable from outside the vehicle.

SUMMARY OF THE INVENTION

This invention is to solve the problem of providing for the emergency release of a security device for a motor vehicle having an automatic transmission, a device which is also actuatable from outside the passenger compartment.

According to the invention, the problem is solved by the fact that the parking brake is connected via an operative connection with a device which is fastened to a stationary part of the motor vehicle which is outside the passenger compartment. This device is also preferably used for towing the motor vehicle and, at the same time, releasing the parking lock connected via the operative connection. In the development of this device, it is proposed that the device has two end positions wherein the end position in which the parking device is released must be lockable. If the parking lock of the automatic transmission is released by the device, the release is maintained also under forces alternatively acting upon the device such as a towing hook.

The stop of the device can be triggered, preferably automatically, by applying a single force to the device. If the parking lock must again be loaded, the stop must be manually released. The simultaneous use of the device as a towing device and for an emergency release has the advantage that the parking lock is automatically released when the vehicle is towed thus ensuring that the parking lock will not be unintendedly damaged.

BRIEF DESCRIPTION OF THE DRAWING(S)

Figure 2:
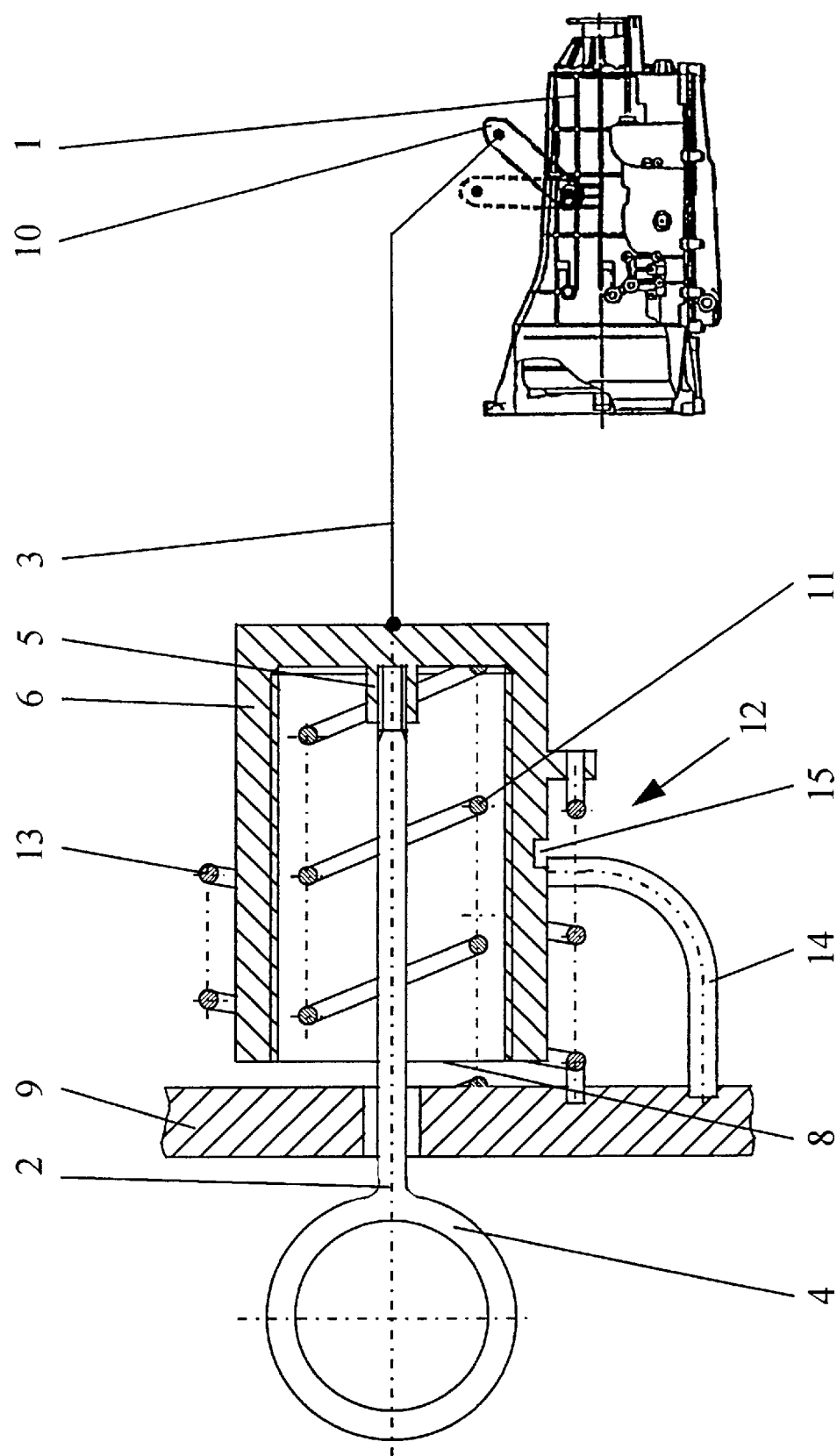

Other features essential to the invention and the advantages resulting therefrom are to be understood from the description that follows of one embodiment of a device for emergency release of a security device for a motor vehicle having an automatic transmission. In the drawing:

FIG. 1 shows a device for emergency release of a security device which is actuated by rotating the device and simultaneously fulfills the function of a towing device; and FIG. 2 shows a device for emergency release of a security device which is actuated by movement in axial direction, automatically stops in this position and by rotation is released and simultaneously fulfills the function of a towing device.

DESCRIPTION OF THE PREFERRED EMBODIMENT(S)

The device for emergency release of a security device comprises the following essential parts: automatic transmission 1, towing device 2 and operative connection 3.

The arrangement operates as follows:

The point of departure is that the motor vehicle has to be towed, but it is not possible to enter in the locked passenger compartment. The gear-selector device is in position P. Now if the towing hook 4 is turned, which has, on one side, a thread 5 by which it is connected with the sleeve 6 and, on the other, a fixture for fastening the towing rope, then the sleeve 6, which by a recess 7 in which meshes a stationary part of the motor vehicle body and which is thus secured against twisting, moves in an axial direction until abutting by its end surface 8 on a stationary part of the body 9. An operative connection 3, preferably in the form of a Bowden cable, which, on one side, is fastened to the sleeve 6 and, on the other, to the release device 10 of the automatic transmission 1, is likewise moved in an axial direction and actuates the release device 10 of the automatic transmission 1. The vehicle now can be towed and the release device remains active during the whole towing operation. If the towing hook 4 of the towing device 2 is turned in the opposite direction, the sleeve 6, the operative connection 3 and the release device 10 move back to the initial state and the security device of the automatic transmission 1 is again activated.

In FIG. 2 is shown a device for emergency release of a security device for a motor vehicle having an automotive transmission in which the device is automatically actuated for emergency release when introducing the towing operating. By applying a force to the towing hook 4 in an axial direction, the towing device 2 and the sleeve 6, which is connected by a thread 5 with the towing device 2, move in axial direction until the sleeve 6 comes into contact with the end surface 8 on the body 9. The spring 11 counters the force acting from the outside upon the towing hook 4. If the sleeve 6 abuts by its end surface 8 on the body 9, then the sleeve 6 is prevented by a stop 12 from returning to the initial position. The operative connection 3 and the release device 10 are likewise moved in an axial direction and thus the security device of the automatic transmission is released. The security device remains active throughout the towing operation. The stop 12 can be released preferably by turning the towing hook 4 and thus the towing device 2 and the sleeve 6 wherein the spring tension of the spring 13 has to be overcome. The towing device 2, the sleeve 6, the operative connection 3 and the release device 10 are moved back to their initial position. The stop 12 can be designed as curved spring 14 which, on one side, is mounted stationarily on the vehicle and, on the other, meshes in a recess 15 which is made on the radially outer boundary of the sleeve 6. The curved spring 14 meshes in the deepest point of the recess 15 of the sleeve 6 when the spring 13 is stress-relieved and by turning, the sleeve 6 is pressed against the spring tension of the spring 13 out of the recess 15, since the depth of the recess diminishes over the periphery of the sleeve 6 until disappearing on the radially outer boundary of the sleeve 6. The security device is again activated and thus the vehicle is secured against unintended motion. The operative connection 3 between the sleeve 6 and the release device 10 can be designed as a Bowden cable.

| Reference numerals | |
| --- | --- |
| 1 automatic transmission | 9 body |
| 2 towing device | 10 release device |
| 3 operative connection | 11 spring |
| 4 towing hook | 12 stop |
| 5 thread | 13 spring |
| 6 sleeve | 14 curved spring |
| 7 recess | 15 recess |
| 8 end surface | |

What is claimed is:

1. A device for releasing, in case of an emergency, a security device for a motor vehicle having a towing device (2), an automatic transmission (1) in which at least one of driving, neutral and parking positions are preset by means of a gear selector device and a parking lock which is activated upon selection of the parking position, wherein the parking lock, when activated, can be deactivated via an external release device (10) which is in operative connection (3) with the parking lock and which is activated by the towing device (2).

2. The device according to claim 1, wherein the operative connection (3) of the towing device (2) to the parking lock is a Bowden cable.

3. The device according to claim 1, wherein the parking lock is deactivated by turning the towing device (2) in one direction and returned to an activated state by turning the towing device (2) in an opposite direction.

4. The device according to claim 1, wherein the parking lock is deactivated by moving the towing device (2) in an axial direction, wherein said towing device (2) is automatically retained at an end surface (8) by a stop (12) and the parking lock is returned to an activated state by turning said towing device (2) to release the stop (12).

5. The device according to claim 4, wherein one side of the stop (12) meshes in a recess (15) of a sleeve (6) of the towing device (2) and on another side is fastened to a stationary part of the motor vehicle, and wherein by turning said towing device (2), said stop (12) is pressed out of said recess (15) in said sleeve (6).

6. The device according to claim 4, wherein the towing device (2), the operative connection (3) and the release device (10) of said parking lock are automatically moved back to the state, in which the parking lock is activated, via a spring (13), after release of said towing device (2).

* * * * *